UNITED STATES PATENT OFFICE.

FRANK HEMINGWAY, OF BOUNDBROOK, NEW JERSEY.

MANUFACTURE OF PURE FERRIC OXID.

1,337,402.  Specification of Letters Patent.  Patented Apr. 20, 1920.

No Drawing.  Application filed August 28, 1919. Serial No. 320,523.

*To all whom it may concern:*

Be it known that I, FRANK HEMINGWAY, a subject of the King of Great Britain, residing at Boundbrook, county of Somerset, and State of New Jersey, have invented certain new and useful Improvements in the Manufacture of Pure Ferric Oxid, of which the following is a specification.

Heretofore pure ferric oxid or red oxid of iron known in the trade as Turkey red, bright red oxid of iron, Indian red, etc., has been produced by the calcination of salts of iron or by the precipitation of hydrates of iron, or by the dry blending of salts of iron together with alkalis or alkaline earths and the calcination of the mixtures. The value of the product of any of these methods depends upon the brightness of the final color and its tinting or staining power.

All of the processes referred to have disadvantages which it is the aim of my invention to overcome. When iron salts are calcined direct, large quantities of acid vapors are evolved, causing a nuisance in the neighborhood or necessitating the erection of suitable condensing apparatus. The shades of color, moreover, are very difficult to control with this method, and vary from batch to batch, necessitating careful blending and also the production of a large quantity of off-shade red oxid.

The production of red oxid of iron by precipitation of an iron salt with an alkali or an alkaline earth presents many difficulties, for the reason that the precipitate is in most cases of a gelatinous nature, because of which the required filtration and washing becomes an elaborate and costly operation. Furthermore, a further step is required in most cases, namely, the oxidation of the precipitated hydrate by air blowing or other means in order to yield suitable shades on calcination.

The dry blending of dry slaked lime with copperas is largely practised in the production of Venetian red which contains varying proportions of ferric oxid and calcium sulfate. Valuable and brilliant shades of pure ferric oxid have not, however, heretofore been obtained by the simple dry blending of ferrous salts and alkalis because of the fact that the iron, before calcination, is in the ferrous condition and the admixtures have not been sufficiently intimate to produce uniformity of burning in the subsequent calcination.

My invention comprises the intimate and continued mixing and grinding of ferrous salts together with alkalis or alkaline earths, usually in the presence of air. I have discovered that when suitable ferrous salts such as the sulfate or chlorid of iron are mixed with alkalis or alkaline earths and the mixture is ground in the cold, by any suitable grinding mill, not only is a more perfect mixture of the ingredients produced, but a definite chemical reaction is found to take place. This results in the continuous change of the iron in the mass from the ferrous to the ferric condition during the process.

As an example of my process, copperas, (ferrous sulfate) may be mixed with sodium carbonate in molecular proportions and continuously ground in the cold, in the presence of air until a perfect mixture of the substances has taken place. It will then be found that the mass consists largely of ferric oxid or hydroxid, or iron carbonate or a mixture of all or some of the same together with sodium sulfate, the water of crystallization of the ferrous sulfate having apparently gone over to the sodium sulfate. The grinding is continued until an impalpable powder has resulted this usually being effected in less than an hour.

The resulting powder containing therein ferric oxid or hydroxid, or iron carbonate, or mixture, as stated, is then passed to any suitable type of furnace and calcined to the temperature necessary to produce the shade required. The calcined ferric oxid is finally lixiviated and the valuable salts of the alkali or alkaline earth used in the process recovered by filtration and crystallization.

It will be observed that when ferrous sulfate and sodium carbonate, for example, are merely mixed dry without grinding, the reaction referred to above does not take place. Subsequent calcination of such a mixture results theoretically in the production of ferric oxid and sodium sulfate, but as stated, it is very difficult with this method to obtain uniformity of product and to produce desired shades of color. With my method in which the step of grinding is introduced, the reaction whereby ferric oxid and sodium sulfate, in the example given above, are produced, takes place prior to the calcination, during the simple grinding. Because of this chemical change and the perfect mixture of the substances the subsequent calcination results uniformly in the production of the desired product of a shade of color which is determined by the temperature at which the calcination is effected.

It will be seen that by the means described the various difficulties and disadvantageous features of former processes, such as the handling of strong acid vapors, the necessity of precipitation, filtration and washing of gelatinous precipitates, etc., are avoided.

Various alkalis and alkaline earths may be used in the process described such for example as the carbonates and hydrates of sodium, potassium and calcium, etc.

In the claims I will refer to the alkalis and alkaline earths generally as alkaline substances.

What I claim is:

1. A process for producing pure ferric oxid, comprising, mixing intimately together a ferrous salt and a dry alkaline substance, grinding the mixture continuously under conditions such that the iron in the mass is largely changed from the ferrous to the ferric condition, and calcining the resulting powder to the necessary temperature to produce a required shade of color.

2. A process for producing pure ferric oxid, comprising mixing intimately together an iron salt and a dry alkaline substance, grinding the mixture continuously under conditions such that the salt is largely converted into an iron hydroxid, oxid or carbonate or mixture of the same, and calcining the resulting powder to the necessary temperature to produce a required shade of color.

3. A process for producing pure ferric oxid, comprising mixing intimately together a ferrous salt and a dry alkaline substance, grinding the mixture in the cold, until the iron in the mass is largely changed from the ferrous to the ferric condition, and calcining the resulting powder to the necessary temperature to produce a required shade of color.

4. A process for producing pure ferric oxid, comprising, mixing intimately together a crystalline ferrous salt containing water of crystallization and a dry alkaline substance, grinding the mixture in the cold, in the presence of air, until the iron in the mass is largely changed from the ferrous to the ferric condition, and calcining the resulting powder to the necessary temperature to produce a required shade of color.

5. A process for producing pure ferric oxid, comprising, mixing intimately together copperas and a dry alkaline substance, grinding the mixture in the cold, in the presence of air, until the iron in the mass is largely changed from the ferrous to the ferric condition, calcining the resulting powder and lixiviating the calcined ferric oxid produced.

This specification signed and witnessed this 27th day of August, 1919.

FRANK HEMINGWAY.

Witnesses:
  DYER SMITH,
  ANNA OATES.